Jan. 13, 1925.

E. A. DAUBENSPECK

GASKET

Filed May 21, 1923

1,523,177

Inventor
E. A. Daubenspeck
By Watson E. Coleman
Attorney

Patented Jan. 13, 1925.

1,523,177

UNITED STATES PATENT OFFICE.

EDWARD A. DAUBENSPECK, OF LANCE CREEK, WYOMING.

GASKET.

Application filed May 21, 1923. Serial No. 640,520.

*To all whom it may concern:*

Be it known that I, EDWARD A. DAUBENSPECK, a citizen of the United States, residing at Lance Creek, in the county of Niobrara and State of Wyoming, have invented certain new and useful Improvements in Gaskets, of which the following is a specification, reference being had to the accompanying drawings.

This invention relates to certain improvements in gaskets and has relation more particularly to a device of this general character especially designed and adapted for use in connection with the stem of an inflating valve for a vehicle tire and it is an object of the invention to provide a novel and improved device of this general character which, when a demountable rim and its tire is positioned upon the felly of a wheel, is positioned between the rim and felly and series to effectually shield the stem opening in the rim so that ingress of water, sand and the like through said opening is prevented whereby the liability of injury from such cause to the casing and tube of the tire is eliminated and also whereby corrosion is prevented.

It is another object of the invention to provide a novel and improved device of this general character which, when applied to a wheel assembly embodying a demountable rim, serves effectually to keep the casing and tube of the tire from becoming damp and rotting and maintains said casing and tube clean and free from rust whereby the tire may be easily removed from the rim.

Furthermore it is an object of the invention to provide a novel and improved device of this general character which serves to prevent the inner tube sticking to the rim and thereby eliminating the liability of tearing the tube when pulling the tire from the rim and which also serves to keep the nut and clamp from rusting tight to the valve stem so that said stem may be easily removed without danger of tearing the tube when it becomes necessary to remove the stem.

The invention consists in the details of construction and in the combination and arrangement of the several parts of my improved gasket whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1:
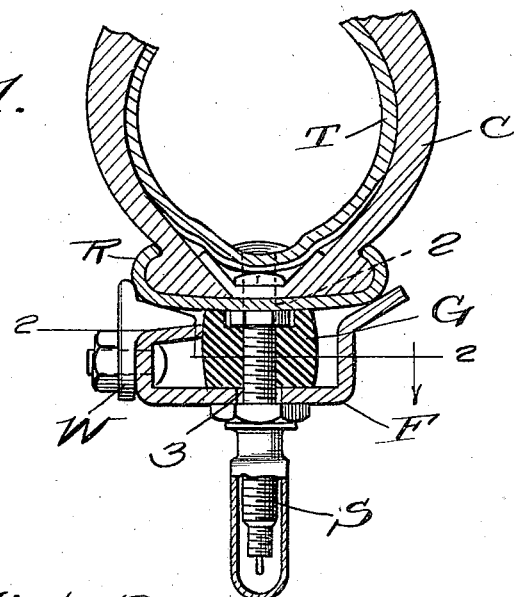
Figure 1 is a fragmentary sectional view illustrating a gasket constructed in accordance with an embodiment of my invention and in applied position.
Figure 2:
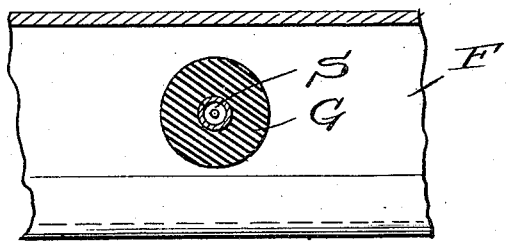
Figure 2 is a fragmentary sectional view taken substantially on the line 2—2 of Figure 1.
Figure 3:
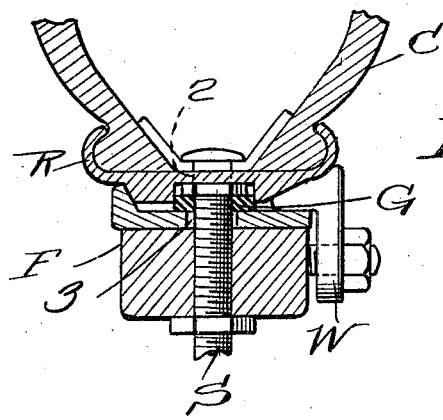
Figure 3 is a sectional view illustrating a gasket constructed in accordance with an embodiment of my invention and in applied position in connection with a demountable rim of a type other than that illustrated in Figure 1.

As disclosed in the accompanying drawings, F denotes the felly of a wheel upon which is adapted to be mounted a demountable rim R, said rim R being maintained in applied position upon the felly F in a conventional manner as by the wedges W or the like.

Arranged upon the rim R is a tire of a conventional type embodying the casing C and the tube T, said tube T having associated therewith an inflating valve stem S of a well known type.

Before mounting the rim R and the applied tire upon the felly F my improved gasket G is engaged with the stem S. This gasket G is made of a suitable compressible material such as pliable rubber stock or the like, said gasket G having disposed through substantially the axial center thereof an opening 1 through which the stem S is inserted, said opening 1 normally being of a diameter less than the maximum diameter of the stem S whereby the gasket, when applied to the stem S has tight contact therewith and thereby prevents the passage of moisture or other foreign substance through the opening 1 past the stem S.

The gasket G is also of an initial thickness or length in excess of the normal space between the felly F and the rim R when said rim R is initially applied to the felly F whereby the gasket G not only bridges such space but requires compression in order to properly mount the rim R upon the felly F. When the wedges W are applied to maintain the rim R in applied position upon the felly F, a further compression of the gasket G occurs which assures an effective closing or sealing of the opening 2 in the rim R through which the stem S is inserted and also effectually seals or closes the opening 3 in the felly F through which the stem S is inserted. The opposite ends of the gasket G are substantially flat so as to have close contact with the opposed faces of the felly F and the rim R.

The particular purpose however of my improved gasket is to seal or entirely close the opening 2 which, as is well known, is of a diameter greater than the diameter of the stem S. By this means moisture, sand, or other foreign substance is prevented from having ingress between the rim R and the applied tire. This sealing together with the maintenance of the tire under sufficient inflation to maintain the beads of the casing C in tight engagement with the clincher flanges of the rim prevents wear and corrosion on the portions of the casing engaged with the rim R and the inner tube T and also maintains the same clean and free from rust so that the tire in its entirety may be easily removed when desired. My improved invention also serves to prevent the tube sticking to the rim R and thus eliminate the danger of tearing the tube when pulling it from the rim. The gasket also serves to maintain the nut and clamp associated with the stem and tube from rusting tight to the stem S so that the same may be easily removed without danger of tearing the tube when it becomes necessary to remove the stem. In fact it has been exclusively demonstrated by actual practice that with the use of my improved gasket the life of the tire is materially prolonged and the necessity of repainting the rim is substantially eliminated.

From the foregoing description it is thought to be obvious that a gasket constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

As a new article of manufacture, a gasket for sealing the opening in an automobile rim for the stem of an inflating valve of a pneumatic tire, said gasket being compressible and having an opening therethrough through which the stem is adapted to be disposed, said opening being initially of a diameter less than the diameter of the stem, said gasket when applied being adapted to be positioned between the tire rim and the felly of a wheel, said gasket being initially of a length in excess of the normal space between the wheel felly and the rim applied thereon, the opposite ends of the gasket being substantially flat for close contact with the opposed faces of the felly and the applied rim.

In testimony whereof I hereunto affix my signature.

EDWARD A. DAUBENSPECK.